(12) United States Patent
Chen et al.

(10) Patent No.: US 10,605,418 B2
(45) Date of Patent: Mar. 31, 2020

(54) RECHARGEABLE FLASHLIGHT

(71) Applicant: E. MISHAN & SONS, INC., New York, NY (US)

(72) Inventors: Qinan Chen, Zhejiang (CN); Isaac Ash, New York, NY (US)

(73) Assignee: E. MISHAN & SONS, INC., New York, NY (US)

( * ) Notice: Subject to any disclaimer, the term of this patent is extended or adjusted under 35 U.S.C. 154(b) by 0 days.

(21) Appl. No.: 16/046,240

(22) Filed: Jul. 26, 2018

(65) Prior Publication Data

US 2020/0032969 A1 Jan. 30, 2020

(51) Int. Cl.
| | |
|---|---|
| *F21L 4/00* | (2006.01) |
| *F21L 4/08* | (2006.01) |
| *F21V 23/06* | (2006.01) |
| *F21V 5/00* | (2018.01) |
| *F21V 14/06* | (2006.01) |
| *F21V 23/04* | (2006.01) |
| *F21Y 115/10* | (2016.01) |

(52) U.S. Cl.
CPC .............. *F21L 4/085* (2013.01); *F21V 5/006* (2013.01); *F21V 14/065* (2013.01); *F21V 23/0428* (2013.01); *F21V 23/06* (2013.01); *F21Y 2115/10* (2016.08)

(58) Field of Classification Search
CPC ......... F21L 4/085; F21V 5/006; F21V 14/065
See application file for complete search history.

(56) References Cited

U.S. PATENT DOCUMENTS

| | | | |
|---|---|---|---|
| 2,876,410 | A | 3/1959 | Fry |
| 6,130,518 | A | 10/2000 | Gabehart et al. |
| 6,507,172 | B2 | 1/2003 | Sherman |
| 6,633,932 | B1 | 10/2003 | Bork et al. |
| 6,668,296 | B1 | 12/2003 | Dougherty et al. |
| D486,936 | S | 2/2004 | Shiu |
| 6,715,071 | B2 | 3/2004 | Ono et al. |
| 6,774,604 | B2 | 8/2004 | Matsuda et al. |
| D495,815 | S | 9/2004 | Saunders |

(Continued)

FOREIGN PATENT DOCUMENTS

CN 2410806 Y 12/2000

OTHER PUBLICATIONS

U.S. Appl. No. 60/273,021, filed Mar. 1, 2001, Daniel M. Fischer, et al. for System and Method for Adapting a USB to Provide Power for Charging a Mobile Device.

*Primary Examiner* — Matthew J. Peerce
(74) *Attorney, Agent, or Firm* — Notaro, Michalos & Zaccaria P.C.

(57) ABSTRACT

A rechargeable flashlight has a rear housing containing a rechargeable battery, a charge/discharge circuit for the battery and a first connector fixed to the rear housing and connected to the charge/discharge circuit. A front housing has an LED light source with LED lighting circuit connected to the light source and mounted in the front housing. A second connector is fixed to a rear end of the front housing for connecting to the first connector for supplying power to the LED lighting circuit. A switch is mounted to the front or rear housings and is connected to one of the circuits for powering the light source. A lens housing on the front housing focuses light from the light source and a mechanical coupler fixes the housings and connects to each other.

17 Claims, 3 Drawing Sheets

(56) References Cited

U.S. PATENT DOCUMENTS

| | | |
|---|---|---|
| 6,798,173 B2 | 9/2004 | Hsu |
| D497,020 S | 10/2004 | Lee |
| D501,942 S | 2/2005 | Saunders |
| 6,874,907 B2 | 4/2005 | Liao |
| 6,886,104 B1 | 4/2005 | McClurg et al. |
| 6,936,936 B2 | 8/2005 | Fischer et al. |
| 6,946,817 B2 | 9/2005 | Fischer et al. |
| D525,733 S | 7/2006 | Shiao |
| 7,375,494 B2 | 5/2008 | Daniel et al. |
| 7,503,671 B2 | 3/2009 | Kang et al. |
| 7,525,291 B1 | 4/2009 | Ferguson |
| 7,802,909 B2 | 9/2010 | Baker |
| 8,030,900 B2 | 10/2011 | Hussain et al. |
| 8,058,840 B2 | 11/2011 | Daniel et al. |
| 8,067,923 B2 | 11/2011 | Daniel et al. |
| 8,344,702 B2 | 1/2013 | Sun et al. |
| 8,358,107 B2 | 1/2013 | Nguyen |
| 8,511,847 B2 | 8/2013 | Sharrah et al. |
| 8,536,840 B2 | 9/2013 | Walter et al. |
| D692,169 S | 10/2013 | Kamm |
| D692,601 S | 10/2013 | Kamm |
| D692,602 S | 10/2013 | Kamm |
| D692,603 S | 10/2013 | Kamm |
| D692,604 S | 10/2013 | Kamm |
| 8,593,115 B2 | 11/2013 | Walter et al. |
| 8,627,121 B2 | 1/2014 | Wu |
| D703,852 S | 4/2014 | Kamm |
| 8,888,311 B2 | 11/2014 | Parsons |
| D725,302 S | 3/2015 | Popper |
| 9,018,918 B2 | 4/2015 | Nguyen |
| 9,057,490 B2 | 6/2015 | Sharrah et al. |
| D742,048 S | 10/2015 | Sheikh et al. |
| 9,206,951 B2 | 12/2015 | McLennan et al. |
| 9,287,730 B2 | 3/2016 | Miller et al. |
| 9,312,706 B2 | 4/2016 | Workman et al. |
| 9,316,366 B2 | 4/2016 | Parsons |
| 9,347,656 B2 | 5/2016 | McLennan et al. |
| 9,362,766 B2 | 6/2016 | Workman et al. |
| 9,515,419 B2 | 12/2016 | Inskeep |
| 9,620,989 B2 | 4/2017 | Meoli |
| D793,597 S | 8/2017 | Feustel et al. |
| 9,723,877 B2 | 8/2017 | Wong et al. |
| 9,780,590 B2 | 10/2017 | Nguyen |
| 9,806,546 B2 | 10/2017 | Eliyahu |
| 9,843,208 B2 | 12/2017 | Inskeep |
| 2001/0021659 A1 | 9/2001 | Okamura |
| 2005/0231941 A1 | 10/2005 | Huang |
| 2006/0250787 A1 | 11/2006 | Ho |
| 2007/0268688 A1 | 11/2007 | Chen |
| 2009/0015229 A1 | 1/2009 | Kotikalapoodi |
| 2011/0068741 A1 | 3/2011 | Liu |
| 2012/0260926 A1* | 10/2012 | Tu .................. A24F 47/008 131/329 |
| 2013/0076298 A1 | 3/2013 | Miller et al. |
| 2013/0343042 A1 | 12/2013 | Windom |
| 2015/0003050 A1 | 1/2015 | Parsons |
| 2015/0036330 A1 | 2/2015 | Economos |
| 2016/0001837 A1 | 1/2016 | Wan |
| 2016/0094069 A1 | 3/2016 | Park et al. |
| 2016/0218538 A1 | 7/2016 | Tsao |
| 2016/0356439 A1 | 12/2016 | Inskeep |
| 2017/0130914 A1* | 5/2017 | Gassauer ................ F21V 29/89 |
| 2017/0194806 A1 | 7/2017 | Inskeep |
| 2017/0222444 A1 | 8/2017 | Hijazi et al. |

* cited by examiner

RECHARGEABLE FLASHLIGHT

FIELD AND BACKGROUND OF THE INVENTION

The present invention relates generally to the field of battery powered flashlights, and in particular to a new and useful rechargeable, high intensity, focusable, LED flashlight.

Recently a new category of high intensity, LED flashlights has become widely available. Examples include the commercially available TacLight brand LED flashlights that have multiple modes of operation and utilizes a white SMD LED lumination source of one watt or more, and the TacLight Pro brand flashlight what also includes an LED lantern feature in an expandable body section.

Battery powered flashlights that are rechargeable are also known, for example, from U.S. Pat. No. 9,843,208 to Inskeep. This type of rechargeable flash can be charged from a wall socket or a computer's USB port but requires a cable and the associated problem of storing, and, when needed, finding the cable.

Rechargeable flashlights are also known that include a blade style power plug that can be plugged into a wall socket for recharging the flashlight's batteries when needed. See U.S. Pat. No. 2,876,410 to Fry, for example.

A need remains for a compact rechargeable flashlight that needs no cable but can be charged from a computer USB or other computer compatible power socket or port.

SUMMARY OF THE INVENTION

It is an object of the present invention to provide a rechargeable flashlight that can be charged using a computer compatible power source such as a USB socket or other like socket that is found on current computers and similar devices as well as in stand-alone power blocks meant to plug into a wall socket.

Accordingly, another object of the invention is to provide a rechargeable flashlight that has a rear housing containing a rechargeable battery, a charge/discharge circuit for the battery and a first connector fixed to the rear housing and connected to the charge/discharge circuit. A front housing of the invention has an LED light source with LED lighting circuit connected to the light source and mounted in the front housing. A second connector is fixed to a rear end of the front housing for connecting to the first connector for supplying power to the LED lighting circuit. A switch is mounted to the front or rear housings and is connected to one of the circuits for powering the light source. A lens housing on the front housing, focuses light from the light source and a mechanical coupler fixes the housings and connects to each other.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
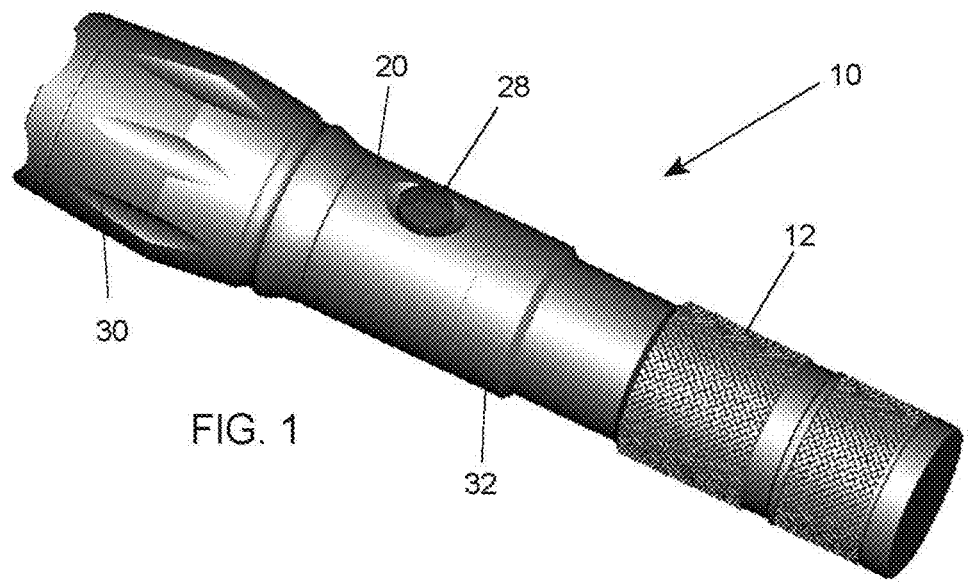
FIG. 1 is a perspective view of a rechargeable flashlight according to the invention.
Figure 2:
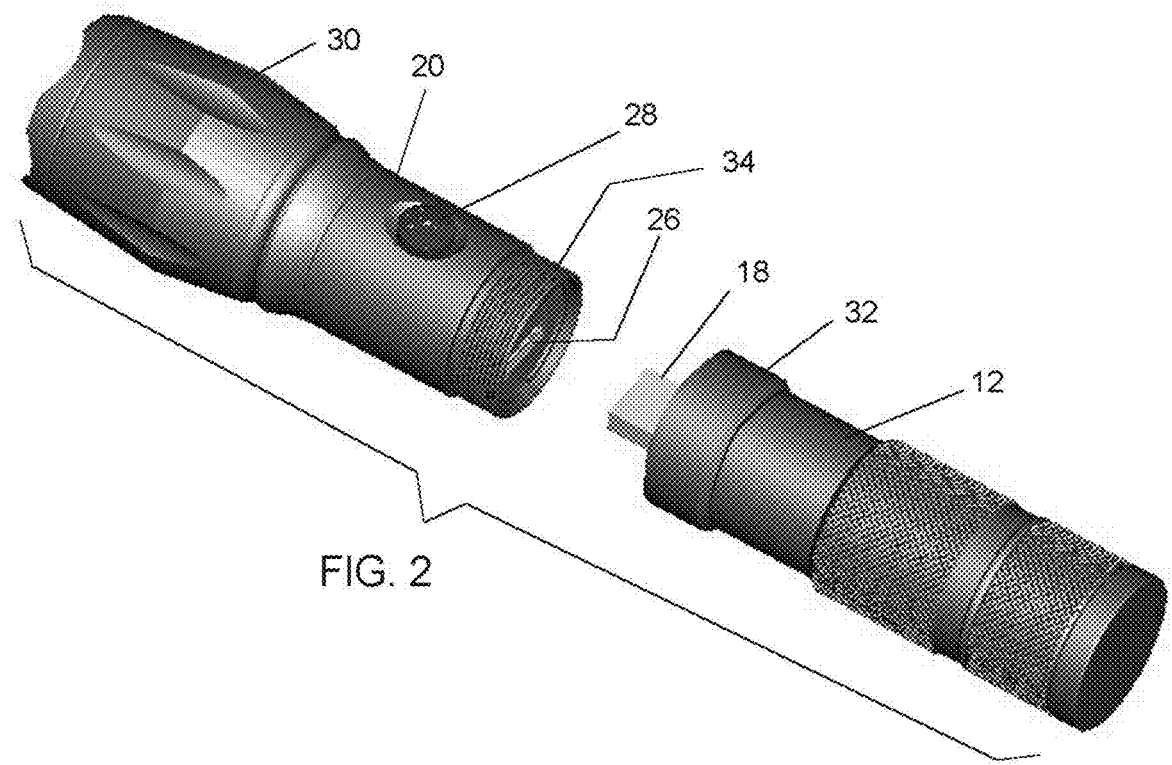
FIG. 2 is a view of the flashlight with its two major components separated to expose computer power source compatible connectors in the form of male and female USB connectors.

Referring now to the drawings, in which like reference numerals are used to refer to the same or similar elements, FIGS. 1, 2, 3 and 4 illustrate a rechargeable flashlight 10 comprising a rear housing 12 containing at least one rechargeable battery 14, a charge/discharge circuit 16 electrically connected to the battery, a first computer power source compatible connector 18 fixed to a front end of the rear housing 12 and electrically connected to the charge/discharge circuit 16, a front housing 20 and at least one SMD LED light source 22 connected to the front housing.

An LED lighting circuit 24 is electronically connected to the light source 22 and is mounted in the front housing 20. This circuit is advantageously a printed circuit board or PCB and includes a shift chip that creates a plurality of illumination modes from the light source, a push button switch 28 on the front housing being repeatedly activated to select from among the illumination modes. For example, when the switch 28 is pressed once, the LED is lite in a first bright, continuous illumination mode of operation. Pressed again, the switch caused the shift chip to select a second mode of illumination, such as a dimmer, continuous illumination mode. A further press of the switch, switched to a flashing light mode and a still further press switches to an SOS or dash-dash-dash, dot-dot-dot, dash-dash-dash mode of discontinuous illumination.

A second computer power source compatible connector 26, that can mate with the first connector 18 to transfer power, is fixed to a rear end of the front housing 20, for mechanically and electrically connecting to the first computer power source compatible connector 18 for supplying power from the at least one battery 14 to the LED lighting circuit 24. The switch 28, while shown mounted to the front housing 20, can be mounted to either the front or the rear housings and be electronically connected to either one of the circuits for powering the light source.

A lens housing 30 is connected to a front end of the front housing 20 and includes a lens 36 for focusing light from the light source 22 leaving the front housing. A mechanical coupler 32 fixes the front end of the rear housing 12 to the rear end of the front housing 20 and maintains the mechanical connection between the housings and their first and second connectors 18 and 26.

Figure 3:
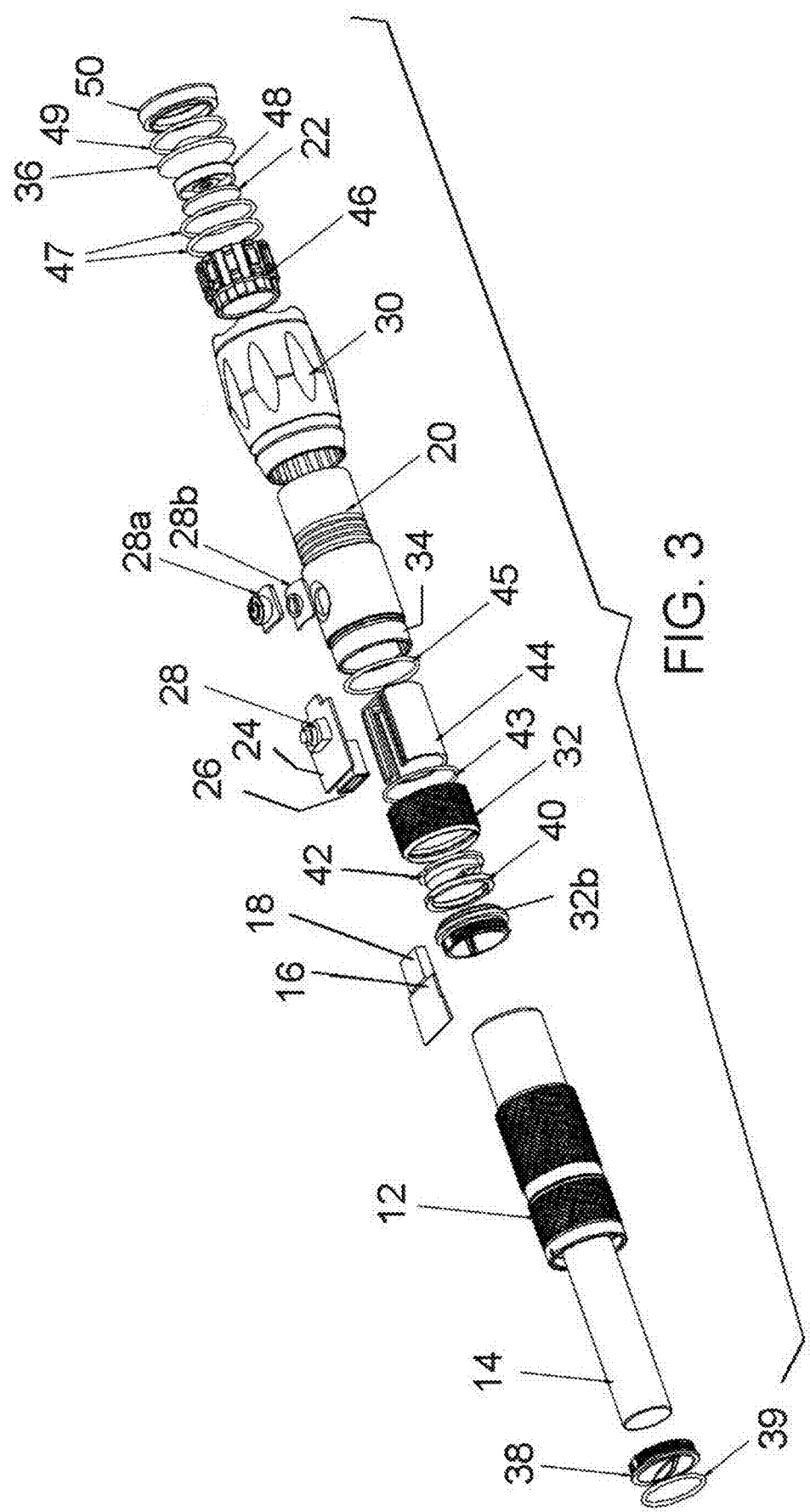
FIG. 3 is an exploded view of the flashlight.
Figure 4:
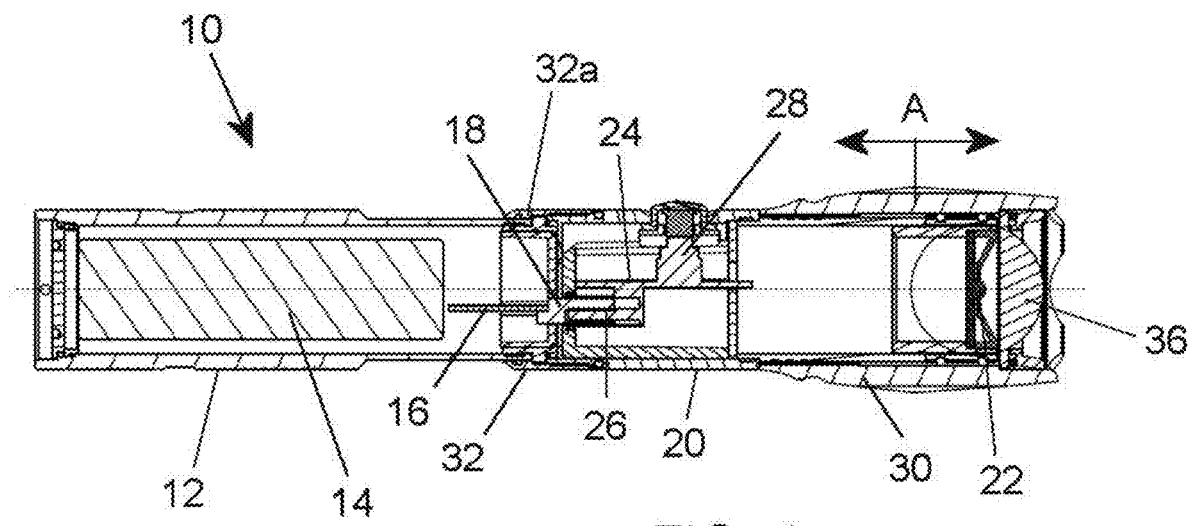
FIG. 4 is a cross sectional view of the flashlight.

The lens 36, as best shown in FIGS. 3 and 4, is a plano-convex lens and the lens housing 30 is linearly movable at the front end of the front housing 20, in the direction of double arrow A, for changing the focus of the light from the light source for spreading and condensing the light to a different extent.

The first and second connectors are preferable USB connectors, with the first connector 18 being a male USB connector and the second connector 26 being a female USB connector, although the male and female connectors can be reverse. Also, the term USB connector in meant to include any generation of USB connecter and any size of USB connector, including the full sized connectors shown, as well as the also computer and computer including device and power plug compatible, mini and micro USB connectors.

The rechargeable flashlight of the invention has a mechanical coupler 32 in the form of a threaded ring rotatably captured near a front end of the rear housing 12, the front housing 20 having a treaded portion 34 at its rear end to which the threaded ring is threaded to maintain the mechanical connection between the rear and front housings 12 and 20, and the first and second connectors 18 and 26. In the alternative, the threaded ring can be replaced by a captured bayonet style push and twist mechanical connector ring, or other style of mechanical connector that can engage with a mating coupler structure at the rear end of the front housing 20.

The mechanical coupler 32 comprising a threaded ring that is rotatably captured near a front end of the rear housing 12, is captured by an inner annular flange 32a of the threaded ring, that catches on an outer annular flange 32b of a treaded end cap which mounts the male USB connector 18, and is treaded into the front end of rear housing 12. The engagement of the inner and outer flanges to each other, prevents the treaded ring 32 from being pulled from the end of rear housing 12. Ring 32 is still easily rotated so it can be treaded to the treaded portion 34 of front housing 20 to maintain the mechanical connection between the rear and front housings.

In greater detail, with reference mainly to FIG. 3, and starting from the rear end of the flashlight, the illustrated embodiment of the rechargeable flashlight of the invention includes a rear end cap 38 threaded to the rear end of the rear housing 12, with a rubber O-ring 39 between the rear end cap and housing to make the connection water tight. Battery 14, preferably a Lithium Ion, high capacity, rechargeable battery, is housed in rear housing 12.

After the threaded ring 32 is slide onto the front end of rear housing 12, the front end cap that carries the outer flange 32b and that has been fixed to the male USB connector 18 that is also fixed to the PCB 16, is then threaded to the front of the rear housing 12. Rubber O-ring 43 is placed between flanges 32a and 32b to maintain the water tight seal to exclude moisture from the interior of rear housing 12.

Aluminum fixing rings 40 and 42 are fixed to the female USB connecter socket 26 and PCB circuit 24, that also carries the push button switch 28. Switch holder 44 is also connected to the assembly and the assembly is inserted into the rear end of front housing 20. A further rubber O-ring 45 is captured in an annular recess in the rear fact of fixing ring 40 to establish a water tight seal when the front and rear housings are engaged and held together by treaded ring 32.

A flexible elastomer switch mat 28a and switch holder 28b are fixed over the switch 28 to also act as a seal against moisture entering the body of the flashlight.

An aluminum LED base 46 is mounted in the front end of front housing 20, and, with rubber O-rings 47 and 49, a plastic mat 48 and the SMD LED light source 22, are locked in the front end of front housing 20 by a plastic locker ring 50. Lens housing 30 with its lens 36 can slide on the front end of front housing 20 to change the degree of spread of light from the LED 22.

The SMD LED light source 22 can be a Cree XT-E brand LED light source or other comparable LED light source.

While a specific embodiment of the invention has been shown and described in detail to illustrate the application of the principles of the invention, it will be understood that the invention may be embodied otherwise without departing from such principles.

What is claimed is:

1. A rechargeable flashlight (10) comprising:
   a rear housing (12) containing at least one rechargeable battery (14), a charge/discharge circuit (16) electrically connected to the at least one battery;
   a first computer power source compatible connector (18) fixed to a front end of the rear housing (12) and electrically connected to the charge/discharge circuit (16);
   a front housing (20);
   at least one LED light source (22) connected to the front housing;
   an LED lighting circuit (24) electronically connected to the light source (22) and mounted in the front housing (20);
   a second computer power source compatible connector (26) fixed to a rear end of the front housing (20), for mechanically and electrically connecting to the a first computer power source compatible connector (18) for supplying power from the at least one battery (14) to the LED lighting circuit (24);
   a switch (28) mounted to one of the front and rear housings and electronically connected to one of the circuits for powering the light source;
   a lens housing (30) connected to a front end of the front housing and including a lens (36) for focusing light from the light source (22) leaving the front housing;
   a mechanical coupler (32) for fixing the front end of the rear housing (12) to the rear end of the front housing and for maintaining a mechanical connection between the first and second connectors (18, 26); and
   a water-tightness assembly, comprising,
   a rear end cap (38) threaded proximate to a rear end of the rear housing (12),
   a lower O-ring (39) provided between the rear end cap and the rear housing (12),
   a threaded ring provided on the mechanical coupler (32), the threaded ring rotatably captured near a front end of the rear housing (12) by an inner annular flange (32a) of the threaded ring, wherein the inner annual flange (32a) catches onto an outer annular flange (32b) of a threaded end cap, wherein the threaded end cap is threaded into a front end of the rear housing (12),
   an intermediate O-ring (43) provided between the inner annual flange (32a) and the outer annual flange (32a),
   a first fixing ring (40) fixed to the second computer power source compatible connector (26),
   a second fixing ring (42) fixed to the LED lighting circuit (24), and
   an upper O-ring (45) captured in an annular recess in the first fixing ring 40.

2. The rechargeable flashlight of claim 1, wherein the lens is a convex lens (36) and the lens housing (30) is linearly movable at the front end of the front housing (20) for changing the focus of the light from the light source for spreading and condensing the light.

3. The rechargeable flashlight of claim 1, wherein the switch (28) is mounted to the front housing and is electronically connected to the LED lighting circuit (24).

4. The rechargeable flashlight of claim 1, wherein the first and second connectors are USB connectors (18, 26).

5. The rechargeable flashlight of claim 1, wherein the first connector (18) is a male USB connector and the second connector (26) is a female USB connector.

6. The rechargeable flashlight of claim 1, wherein the LED lighting circuit (24) includes chip circuitry for creating a plurality of illumination modes from the light source, the switch (28) being repeatedly activated to select from among the illumination modes.

7. The rechargeable flashlight of claim 1, the front housing (20) having a threaded portion at its rear end to which the threaded ring is threaded to maintain the mechanical connection between the rear and front housings (12, 20) and the first and second connectors (18, 26).

8. The rechargeable flashlight of claim 1, wherein the first connector (18) is a male USB connector and the second connector (26) is a female USB connector, the front housing (20) having a threaded portion at its rear end to which the threaded ring is threaded to maintain the mechanical connection between the rear and front housings (12, 20) and the first and second connectors (18, 26).

9. The rechargeable flashlight of claim 1, wherein the first connector (18) is a male USB connector and the second connector (26) is a female USB connector, the front housing (20) having a threaded portion at its rear end to which the threaded ring is threaded to maintain the mechanical connection between the rear and front housings (12, 20) and the first and second connectors (18, 26).

10. The rechargeable flashlight of claim 1, wherein, the front housing (20) having a portion at its rear end to which the coupling ring is engaged to maintain the mechanical connection between the rear and front housings (12, 20) and the first and second connectors (18, 26).

11. A rechargeable flashlight comprising:
a rear housing containing a rechargeable battery,
a charge/discharge circuit for the battery and a first computer power source compatible connector fixed to the rear housing and connected to the charge/discharge circuit;
a front housing having an LED light source with LED lighting circuit connected to the light source and mounted in the front housing;
a second computer power source compatible connector fixed to a rear end of the front housing for connecting to the first computer power source compatible connector for supplying power to the LED lighting circuit;
a switch mounted to the front or rear housings and connected to one of the circuits for powering the light source;
a lens housing on the front housing for focusing light from the light source; and
a mechanical coupler for fixing the housings and the computer power source compatible connectors to each other; and
a water-tightness assembly, comprising,
a rear end cap (38) threaded proximate to a rear end of the rear housing (12),
a lower O-ring (39) provided between the rear end cap and the rear housing (12),
a threaded ring provided on the mechanical coupler (32), the threaded ring rotatably captured near a front end of the rear housing (12) by an inner annular flange (32a) of the threaded ring, wherein the inner annual flange (32a) catches onto an outer annular flange (32b) of a threaded end cap, wherein the threaded end cap is threaded into a front end of the rear housing (12),
an intermediate O-ring (43) provided between the inner annual flange (32a) and the outer annual flange (32a),
a first fixing ring (40) fixed to the second computer power source compatible connector (26),
a second fixing ring (42) fixed to the LED lighting circuit (24), and
an upper O-ring (45) captured in an annular recess in the first fixing ring 40.

12. The rechargeable flashlight of claim 11, wherein the first computer power source compatible connector is a male USB connector and the second computer power source compatible connector is a female USB connector, the front housing having a threaded portion at its rear end to which the threaded ring is threaded to maintain the mechanical connection between the rear and front housings and the first and second connectors.

13. The rechargeable flashlight of claim 11, wherein the LED lighting circuit includes a shift chip for creating a plurality of illumination modes from the light source, the switch being repeatedly activated to select from among the illumination modes.

14. The rechargeable flashlight of claim 11, wherein the lens housing includes a convex lens, the lens housing being linearly movable at the front end of the front housing for changing the focus of the light from the light source for spreading and condensing the light.

15. The rechargeable flashlight of claim 11, wherein the switch is mounted to the front housing and is electronically connected to the LED lighting circuit.

16. The rechargeable flashlight of claim 11, wherein the first and second computer power source compatible connectors are USB connectors.

17. The rechargeable flashlight of claim 11, wherein the first computer power source compatible connector is a male USB connector and the second computer power source compatible connector is a female USB connector.

* * * * *